United States Patent [19]

Hirai

[11] Patent Number: 4,571,047
[45] Date of Patent: Feb. 18, 1986

[54] TTL FOCUS DETECTING DEVICE FOR SINGLE-LENS REFLEX CAMERA

[75] Inventor: Isamu Hirai, Tokyo, Japan

[73] Assignee: Asahi Kogaku Kogyo Kabushiki Kaisha, Tokyo, Japan

[21] Appl. No.: 618,165

[22] Filed: Jun. 7, 1984

[30] Foreign Application Priority Data

Jun. 22, 1983 [JP] Japan ................................ 58-112523

[51] Int. Cl.⁴ ............................................... G03B 3/00
[52] U.S. Cl. ..................................... 354/403; 354/406
[58] Field of Search ................ 354/402, 403, 406, 407

[56] References Cited

U.S. PATENT DOCUMENTS

| | | | |
|---|---|---|---|
| 4,385,817 | 5/1983 | Saito | 354/403 |
| 4,518,242 | 5/1985 | Toyama | 354/403 |
| 4,521,093 | 6/1985 | Kawabata et al. | 354/403 |

Primary Examiner—Russell E. Adams
Attorney, Agent, or Firm—Sughrue, Mion, Zinn, Macpeak & Seas

[57] ABSTRACT

A focus detecting device for use with a single-lens reflex camera in which chromatic aberration of an infrared beam used for focusing is corrected. When the brightness of the image to be photographed is sufficiently high, a beam of visible light is used for focusing, while when the brightness is not sufficiently high, an infrared beam is employed. In the latter case, a chromatic aberration correction signal is employed to correct the focus detection signal so that the focused position as indicated by that signal coincides with that in the case of the visible beam for the same distance to the object. The chromatic aberration correction signal is preferably produced in response to a resistor or the like mounted on the lens.

6 Claims, 9 Drawing Figures

TTL FOCUS DETECTING DEVICE FOR SINGLE-LENS REFLEX CAMERA

BACKGROUND OF THE INVENTION

The present invention relates to a focus detecting device for a camera. More particularly, the invention relates to a focus detecting device employing an infrared beam for focus detection which passes through the photographing lens of the camera.

A variety of devices in which an infrared beam is utilized for focus detection have been proposed in the art. In the case where the device is used with a single-lens reflex camera having an interchangeable lens, that is, where it is utilized as a TTL (Through The Lens) focus detecting device, in an ordinary photographing lens in which the focused position changes with the wavelength of the light (i.e., where chromatic aberration is corrected only in the visible region), the visible beam focused position does not coincide with the infrared beam focused position. In addition, different photographing lenses exhibit a difference between the visible beam focused position and the infrared beam focused position. Therefore, the photographing lenses must be individually corrected.

SUMMARY OF THE INVENTION

In view of the foregoing, the invention provides a chromatic aberration correction signal corresponding to a chromatic aberration value in the infrared region for each interchangeable lens so that a chromatic aberration correction is automatically carried out upon replacement of the interchangeable lens.

DESCRIPTION OF THE PREFERRED EMBODIMENTS

The invention will now be described with reference to the accompanying drawings.

Figure 1:
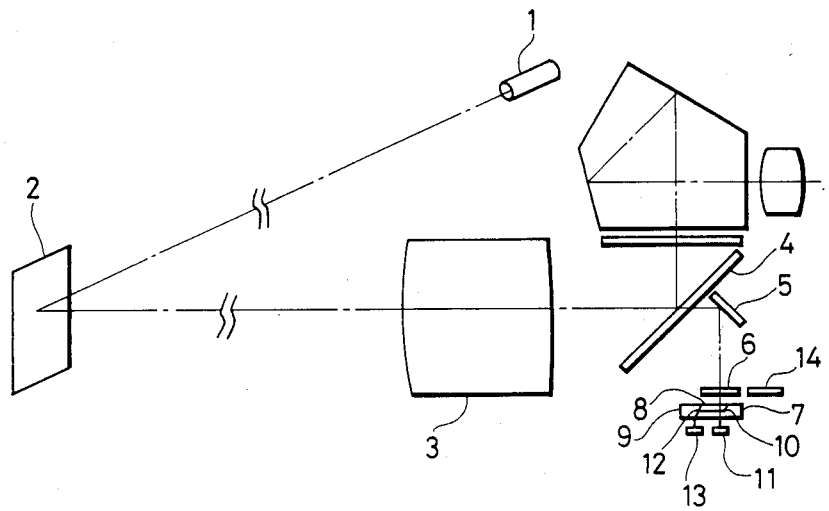
FIG. 1 is a schematic diagram showing an example of a single-lens reflex camera having a TTL focus detecting device according to the invention.

FIG. 1 shows an example of a single-lens reflex camera employing a TTL focus detecting device according to the invention.

An infrared beam emitted by an infrared beam emitting diode 1 is reflected by an object 2 and is passed through a photographing lens 3 and a half-silvered mirror 4. The infrared beam thus passed is reflected downwardly by a second mirror 5, and applied through a visible light blocking filter 6 to an optical element composed of glass blocks 7, 8 and 9. The incident light beam is divided into two parts by a half-silvered mirror 10. One of the two parts advances straightly to an A sensor 11; the other is applied to a B sensor 13 after being reflected by the half-silvered mirror 10 and a mirror 12. The visible light blocking filter 6 can be selectively replaced by an infrared beam blocking filter 14.

In a focus detecting system employed in the above-described embodiment, focus detection is carried out utilizing variations in the contrast of the object's image. That is, the focus detecting system is based on the fact that the image of an object formed by the lens exhibits maximum contrast when the lens is focused on the object. Hereinafter, such a focus detecting system will be referred to as "a contrast detecting system" when applicable.

In the contrast detecting system, each of the sensors 11 and 13 in FIG. 1 is composed of an array of small sensor elements. The difference in output between the elements, corresponding to the contrast value, is a maximum when the correctly focused position of the lens has been reached. The A sensor 11 and B sensor 13 are positioned opposite sides of an estimated focused position are equidistantly spaced from the estimated focused position.

Figure 2:
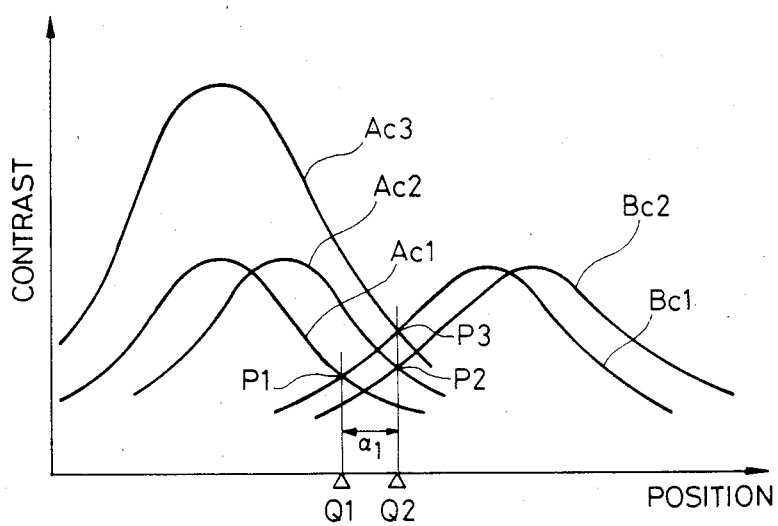
FIG. 2 is a diagram used for a description of focus position detection correction made using contrast signals obtained with the aid of an infrared beam.

FIG. 2 shows contrast signals which the A sensor 11 and B sensor 13 provide when using an infrared beam, contrast signals which the A sensor 11 and B sensor 13 provided when using a visible beam, and a chromatic-aberration-corrected contrast signal which is obtained by applying chromatic aberration correction to the infrared beam. More specifically, in FIG. 2, Ac1 designates a contrast signal which the A sensor 11 provides by using an infrared beam, and Bc1 designated a contrast signal which the B sensor 13 provides by using an infrared beam. On the horizontal axis, a position Q1 corresponding to the intersection P1 (Ac1=Bc1) of the contrast signal curves Ac1 and Bc1 is the focused position for the infrared beam. Further in FIG. 2, Ac2 designates a contrast signal which the A sensor 11 provides by using a visible beam, and Bc2 designates a contrast signal which the B sensor 13 provides by using the visible beam. On the horizontal axis, a position Q2 corresponding to the intersection P2 of the contrast signal curves Ac2 and Bc2 is the focused position for the visible beam. The difference $\alpha_1$ between the focused position for the infrared beam and the focused position for the visible beam is a chromatic aberration correction value.

Figure 3:
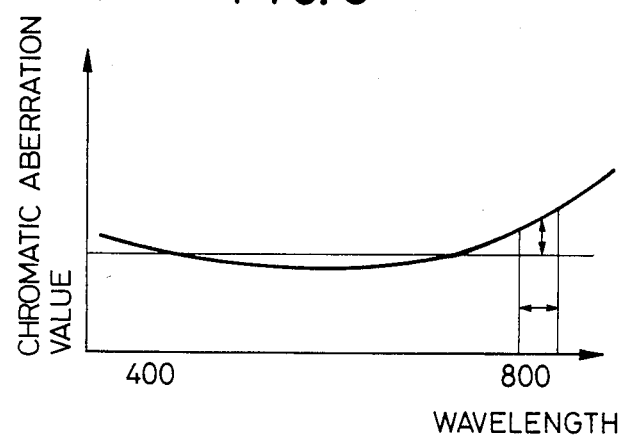
FIG. 3 is a diagram showing an example of a chromatic aberration value on the axis of a lens.

Conductive to an understanding of the chromatic aberration correction value $\alpha_1$, FIG. 3 shows an example of a lens chromatic aberration curve. More specifically, FIG. 3 shows a chromatic aberration value $\alpha_2$ for a emitted infrared range $\beta$. The chromatic aberration value $\alpha_2$ is equivalent to the chromatic aberration correction value $\alpha_1$ in FIG. 2.

As shown in FIG. 2, the infrared beam focused position is not coincident with the visible beam focused position. In obtaining the visible beam focused position using the infrared beam, the contrast signal Ac1 which the A sensor 11 provides using the infrared beam is multiplied by a chromatic aberration correction factor C which is determined so that the position of a point P3, where a chromatic-aberration-corrected contrast signal Ac3 (where Ac3=Ac1×C) is equal to the contrast signal Bc1 which the B sensor provides using the infrared beam, coincides with the visible beam focused position $Q_2$. That is, by making Ac3=Bc1 it is possible to detect the visible beam focused position using the infrared beam. The chromatic aberration correction factor C is a constant inherent to the interchangeable lens which is obtained from the chromatic aberration value $a_2$. It is difficult to obtain the chromatic aberration correction factor C from the inside of the camera; it is preferable that the factor C be obtained from the interchangeable lens side.

Figure 4:
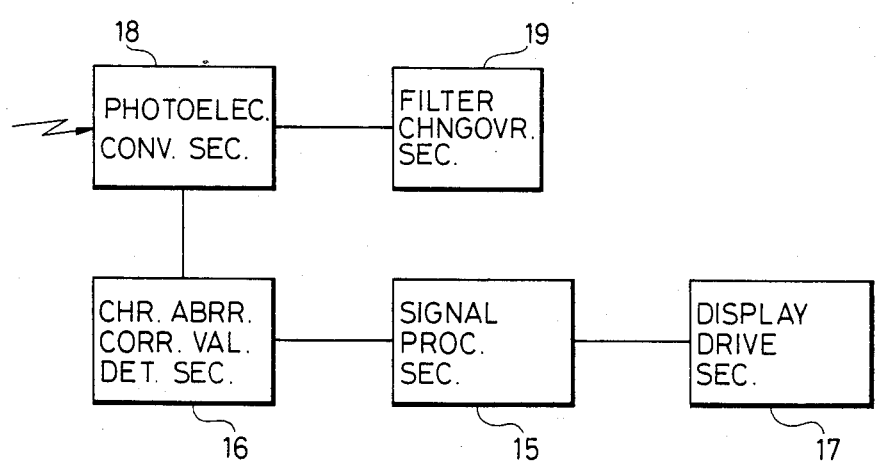
FIG. 4 is a block diagram showing an example of a focus detecting device according to the invention.

FIG. 4 is a block diagram showing the arrangement of an example of the TTL focus detecting device according to the invention. In FIG. 4, a signal processing section 15 is connected to a chromatic aberration correction value detecting sensor for detecting a chromatic aberration correction signal from the lens, and to a display/drive section 17. The contrast signal from the A sensor 11 in FIG. 1 is corrected with the chromatic aberration correction value for the infrared beam by the output signal of the chromatic aberration correction value detecting section 16, and the corrected value is transmitted to the display/drive section 17 so that displaying and driving the lens is controlled in a conventional manner. A photoelectric conversion section 18 adapted to control the light emission of the infrared LED, detection of the chromatic aberration correction signal, and switching of the infrared beam blocking filter 14 and the visible beam blocking filter is connected to the chromatic aberration correction value detecting section 16 and a filter changeover section 19.

When the object is found to be high in brightness as detected by a sensor, the conventional focus detecting operation using a visible beam is carried out in which the infrared beam blocking filter 14 is used, the infrared LED is not operated, and no chromatic aberration correction signal is detected. When the object is low in brightness, the infrared LED is caused to emit light, the chromatic aberration correction signal from the lens is detected, and the filter changeover section 19 is operated to move the visible beam blocking filter 6 into position.

Figure 5:
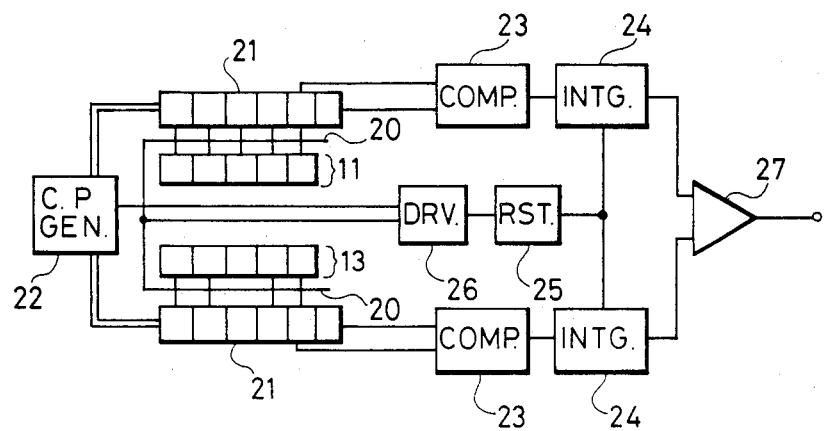
FIG. 5 is a diagram showing an example of a signal processing section used in the device of FIG. 4.

An example of the signal processing section 15 is as shown in FIG. 5. The outputs of light-detecting element arrays 11 and 13 (shown in FIG. 1 also) are passed through transfer gates 20 to transfer element arrays 21 where they are shifted to the right successively in response to clock pulses (transfer pulses) provided by a clock pulse generator 22. The number of transfer elements of each transfer element arrays 21 is larger by one than the number of light-detecting elements in each light-detecting element array. Each transfer element array has taps to simultaneously output the signal of the last light-detecting element and the preceding signal, whereby the outputs of two adjacent light-detecting elements are simultaneously applied to a comparison circuit 23.

Figure 6:
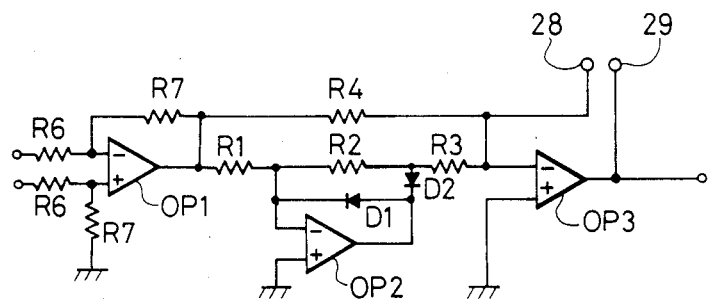
FIG. 6 is a circuit diagram showing an example of a comparision circuit in FIG. 5.

An example of the comparison circuit 23 is shown in FIG. 6. In the comparison circuit 23, an operational amplifier OP1 outputs the difference between two signals applied thereto through resistors R6. A circuit composed of operational amplifiers OP2 and OP3, diodes D1 and D2, resistors R1, R2, R3 and R4, and a resistor R5 or R8 (cf. FIG. 9) connected between connecting terminals 28 and 29 generates a signal representing the absolute value of the difference signal. That is, the comparison circuit provides the absolute value of the two input signals. The amplification factor of this circuit depends on the resistance of the resistor connected between the terminals 28 and 29. In the comparison circuit 23 in the lower part of FIG. 5, a resistor R8 having a constant resistance value is connected between the terminals 28 and 29 at all times. In the comparison circuit 23 in the upper part of FIG. 5, when the chromatic aberration correction value detecting section uses the infrared beam as determined by the signal from the photoelectric conversion section, the resistor R5 is connected between the terminals, and when it uses the visible beam, the resistor R8 is connected therebetween. In the case where the infrared beam is used, the ratio of the amplification factor on the side of the light-detecting element array 11 which is defined by the resistor R5 to the amplification factor on the side of the light-detecting element array 13 defined by the resistor R8 corresponds to the above-described correction factor C.

Figure 7:
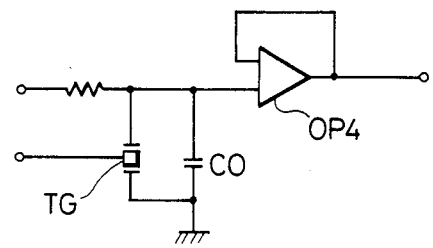
FIG. 7 is a circuit diagram showing an example of an integrating circuit used in the signal processing section of FIG. 5.

Each comparison circuit 23 outputs a difference absolute value signal which is integrated into a contrast output by an integrating circuit 24. An example of the integrating circuit 23 is shown in FIG. 7. In FIG. 7, OP4 designates an operational amplifier; CO, a capacitor; and TG, a transfer gate which is used to short-circuit the capacitor CO.

Referring back to FIG. 5, reference numeral 25 designates a reset circuit for the integrating circuits 24, the reset circuit operating to reset the contrast outputs for every scanning; and 26, a drive circuit for the transfer gates 20. The two contrast outputs are compared with a differential amplifier 27, from the output of which various focusing conditions such as front focusing, correct focusing and rear focusing conditions can be detected.

Figure 8:
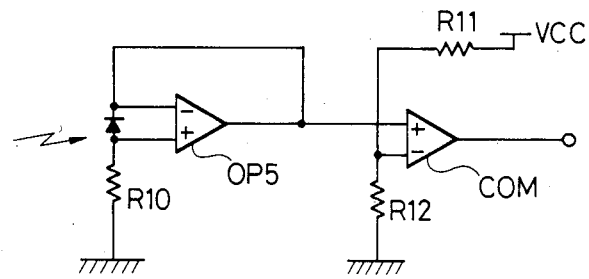
FIG. 8 is a circuit diagram showing an example of a photoelectric conversion section used in the focus detecting device of FIG. 4.

FIG. 8 shows an example of the photoelectric conversion section 18. The section 18, which includes resistors R10, R11 and R12, an operational amplifier OP5 and a comparator COM, provides a high level output or low level output according to the quantity of light received. The output of the comparator COM is amplified to control the operation of the infrared LED, the operation of the chromatic aberration correction value detecting section 16, and the switching operation of the filter changeover section 19. In the above-described embodiment, the sensor is provided in addition to the A sensor 11 and the B sensor 13 which are used for focus detection. However, it may be used as the A sensor or the B sensor.

Figure 9:
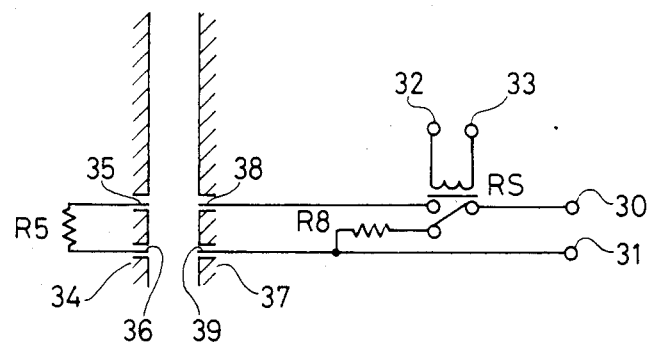
FIG. 9 is a diagram showing an example of chromatic aberration correction value detecting section used in the focus detecting device of FIG. 4.

FIG. 9 shows an example of the chromatic aberration correction value detecting section 16. The section 16 has terminals 30 and 31 connected to the terminals 28 and 29 of the above-described comparison circuit 23. Terminals 32 and 33 of a switch RS are connected to the output of the comparator COM to select one of the resistors R5 and R8. The resistor R5 having the resistance defined in correspondence to the chromatic aberration correction factor C is provided on the side of the interchangeable lens because the chromatic aberration correction value is inherent to the lens. The terminals of the resistor R5 are connected to respective signal transmitting pins 35 and 36, which are electrically insulated from a lens mount member 34. In correspondence to the signal transmitting pins 35 and 36, signal transmitting pins 38 and 39 are provided on a mount member 37 on the camera body side electrically insulated from the mount member 37. Accordingly, when the lens is mounted on the camera body so that the signal transmitting pins on the camera body side, if the object's brightness measured by the photoelectric conversion section is at a low level, a chromatic-aberration-corrected contrast output is obtained due to the amplification factor on the side of the light-detecting element array 11. That is, the visible beam focused position can be obtained by using the infrared beam.

In the above-described embodiment, the chromatic aberration correction signal is electrically transmitted through the signal transmitting pins. However, the chromatic aberration correction signal may be effectively transmitted by a mechanical arrangement, for instance, utilizing the angle of rotation of a transmitting lever. Also, it may be transmitted as a digital signal to improve the accuracy.

The above-described focus detecting device employs a contrast detecting system. However, also in a focus detecting device operating in accordance with a so-called "phase difference detecting system" based on the fact that the amount of phase difference between two signal waveforms is dependent on the amount of defocusing, an infrared beam chromatic aberration correction can be applied to each lens by applying the chromatic aberration correction signal from the lens side, and focus detection can be achieved using the infrared beam.

As is apparent from the above description, in the TTL focus detecting device according to the invention, when an object is high in brightness, focus detection is carried out using a visible beam, and when an object is low in brightness, an infrared beam is used to perform chromatic aberration correction focus detection. Therefore, the problem of focus detection when an object is low in brightness using only a visible beam has been solved according to the invention by the use of an infrared beam. Furthermore, the device of the invention, which is of simple construction, can apply an infrared beam chromatic aberration correction to each interchangeable lens as described above. Moreover, the focus detection operation is performed with a high accuracy.

I claim:

1. A focus detecting device for a camera, comprising:
   a source of infrared light directed on an object;
   means for transmitting a selected one of said infrared beam and a visible beam passing through a photographing lens of said camera, said infrared beam being emitted and transmitted when a brightness of an image viewed through said photographing lens is below a predetermined value and said visible beam being transmitted when said brightness of said image is above said predetermined value;
   means for producing a focus detection signal in response to light from the emitted one of said infrared beam and said visible beam reflected by said object through said photographing lens; and
   means for correcting said focus detection signal when said infrared beam is emitted so that a focused position indicated by said focus detection signal when said infrared beam is emitted coincides with a focused position indicated by said focus detection signal when said visible beam is emitted.

2. The focus detecting device of claim 1, further comprising means for disposing an infrared blocking filter in the path of light received through said photographing lens in the case that said visible beam is emitted and for disposing a visible light blocking lens in said path when said infrared beam is emitted.

3. The focus detecting device of claim 2, wherein said lens comprises a detachable lens, and wherein said correcting means comprises means mounted on said lens indicative of a chromatic aberration correction value of said lens.

4. The focus detecting device of claim 3,
   wherein said means for providing said focus detection signal comprises:
   first and second sensor element arrays disposed symmetrically with respect to an estimated focused position and equidistantly spaced from said estimated focused position;
   first and second comparators;
   means for successively applying to said first and second comparators output signals from pairs of adjacent ones of elements of said first and second arrays, respectively;
   first and second integrating means for integrating outputs of said first and second comparators, respectively; and
   a differential amplifier for producing as said focus detection signal a signal representing a difference between outputs of said first and second integrators; and
   wherein said correcting means comprises:
   means for varying a gain factor of one of said comparators in response to the selection of said infrared beam and said visible beam.

5. The focus detecting device of claim 4, wherein gain factor of said comparators are equal when said visible beam is emitted and unequal when said infrared beam is emitted.

6. The focus detecting device of claim 4, wherein said correcting means comprises a resistor mounted on the side of said lens, a first set of contacts on said lens coupled to said resistor, and a second set of contacts on a body of said camera adapted to mate with said first set of contacts when said lens is mounted on said camera body.

* * * * *